(No Model.) 2 Sheets—Sheet 1.

L. SCOFIELD.
PLANTER.

No. 411,203. Patented Sept. 17, 1889.

Witnesses.
Chas. R. Burr.
Thomas Durant.

Inventor
Levi Scofield,
by Church & Church,
his Attorneys.

(No Model.) 2 Sheets—Sheet 2.

L. SCOFIELD.
PLANTER.

No. 411,203. Patented Sept. 17, 1889.

Witnesses
Chas. R. Burt
Thomas Durant

Inventor
Levi Scofield,
by Church & Church
his Attorneys.

UNITED STATES PATENT OFFICE.

LEVI SCOFIELD, OF GRAND HAVEN, MICHIGAN.

PLANTER.

SPECIFICATION forming part of Letters Patent No. 411,203, dated September 17, 1889.

Application filed December 15, 1888. Serial No. 293,700. (No model.)

*To all whom it may concern:*

Be it known that I, LEVI SCOFIELD, of Grand Haven, in the county of Ottawa and State of Michigan, have invented certain new and useful Improvements in Planters; and I do hereby declare the following to be a full, clear, and exact description of the same, reference being had to the accompanying drawings, forming a part of this specification, and to the figures and letters of reference marked thereon.

This invention relates to that class of planters in which a runner or equivalent device is employed to form a furrow and suitable feeding and dropping mechanism is arranged to deposit the seed at intervals in the furrow, which latter is closed or the seed covered under by covering devices following the runner; and the said invention consists, principally, in the approved means for applying, adjusting, and actuating a fertilizer attachment, as hereinafter more fully described, and pointed out in the claims.

Figure 1:
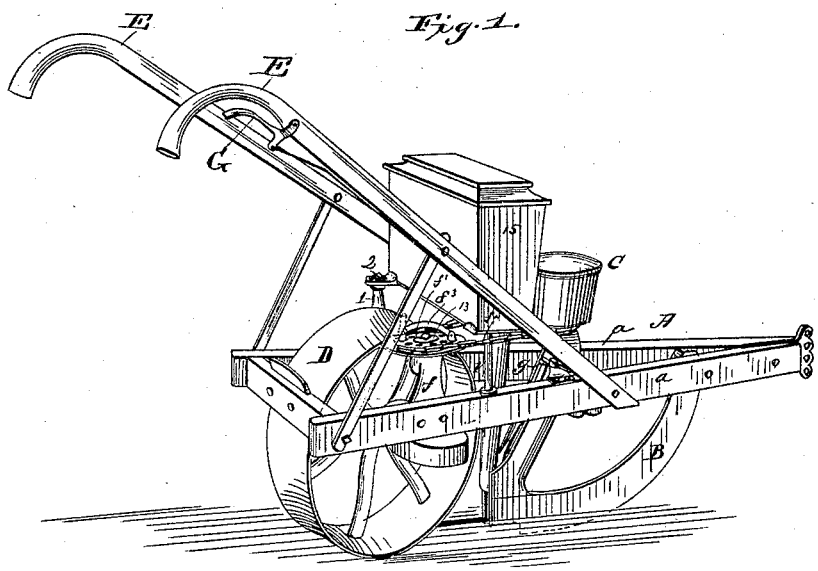
Figure 2:
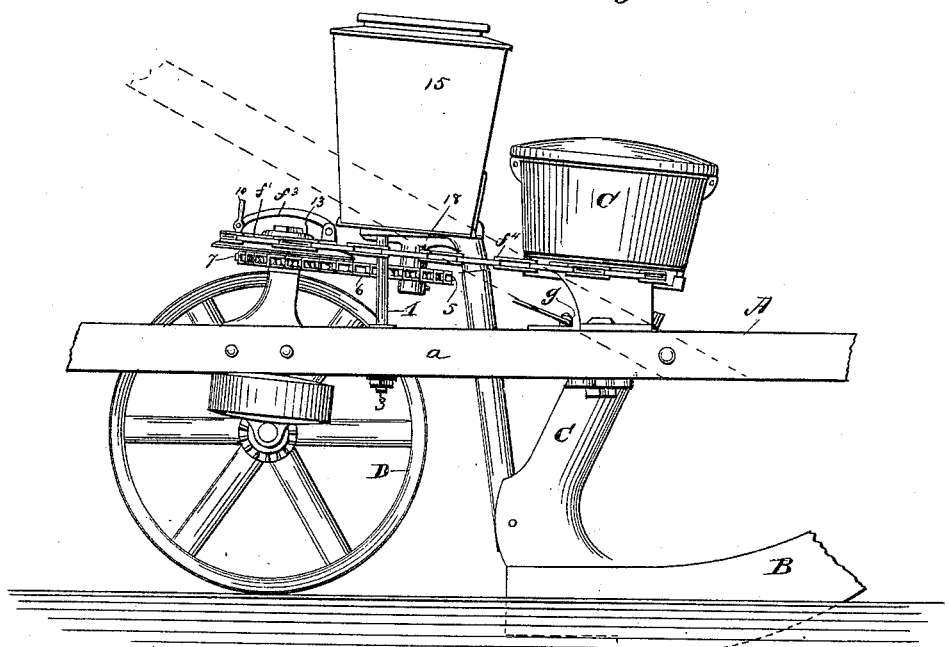
Figure 3:
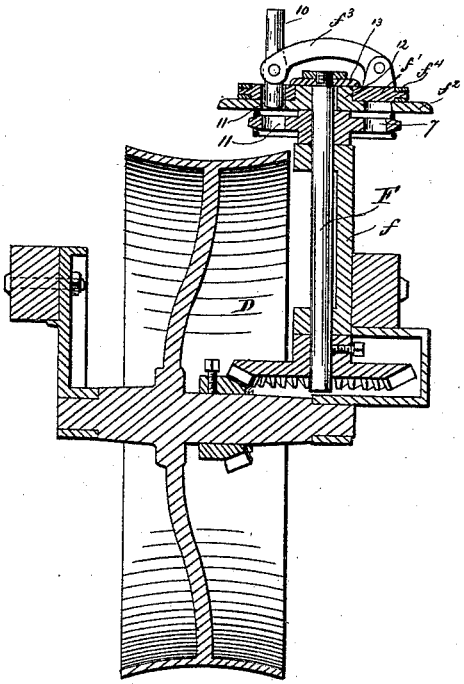
Figure 4:
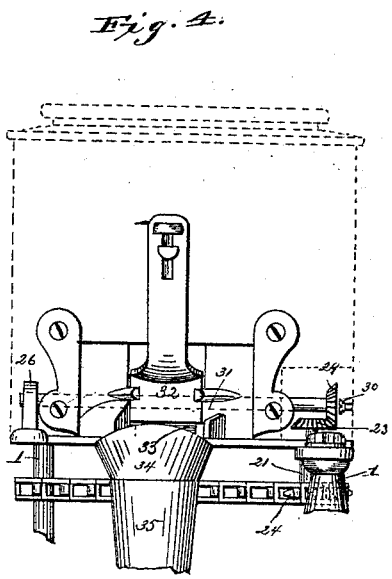
Figure 5:
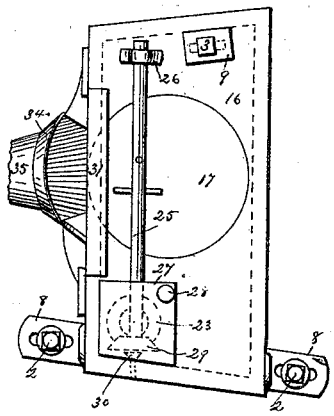
Figure 6:
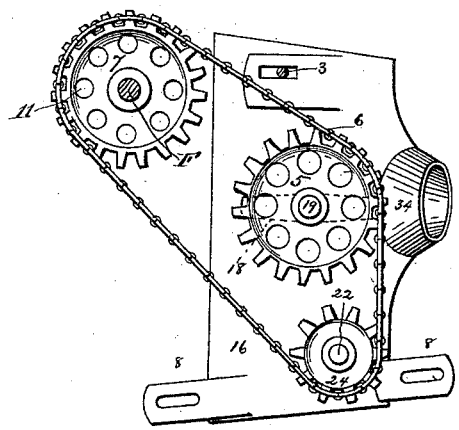

In the accompanying drawings, Figure 1 is a view in perspective of a planter, showing one application of my present improvements. Fig. 2 is a side elevation of the seeding and fertilizing mechanism and a portion of the frame and runner. Fig. 3 is a sectional view of the driving-gear. Fig. 4 is a front elevation of the fertilizer attachment, the box being shown in dotted lines. Fig. 5 is a top plan view, and Fig. 6 a bottom plan view, of the fertilizer attachment.

Similar letters of reference in the several figures indicate the same parts.

The particular type of machine shown in illustration of one application of my invention is similar to that described in my patent of March 20, 1877, No. 188,547, and comprises a frame A, runner B, seeder C, wheel D, and handles E, the whole constructed and combined together substantially as set forth in my said patent. A vertical shaft F, mounted in a bracket $f$ and driven through bevel or other gearing from the wheel D, carries a loose sprocket-wheel $f'$ and fixed disk $f^2$, the former provided with a pawl or latch $f^3$ for engaging openings or notches in the disk $f^2$.

Motion is transmitted to the seed-plate or other feed-regulating device through a chain $f^4$, engaging the sprocket-wheel $f'$, and by means of the latch $f^3$ the said sprocket-wheel can be readily thrown into or out of engagement with the disk $f^2$, which is keyed or otherwise fastened to the shaft F. A cut-off is arranged in the conduit leading from the feeding devices, and is actuated by a lever G on one of the handles to open the passage and permit the seed to be deposited. The cut-off valve is closed by a spring and held open, when desired, by a latch $g$ on the handle. The fertilizer attachment is mounted in rear of the seed-box and preferably supported upon uprights or spools 1, resting upon the side bars $a$ of the frame and held in place by bolts 2 3, passing through the side bars and uprights and engaging the bottom plate or frame of the hopper 15.

The feed-plate or frame of the fertilizer carries a sprocket-wheel 5, through which motion is communicated to the feeding devices through a chain or equivalent connection 6, the latter embracing a second loose sprocket-wheel 7 on shaft F.

To provide for taking up slack in the driving-chain, the bolts 2 on one side are passed through slots in the ears 8, while the bolt 3 on the opposite side passes through an elongated slot in the bottom of the hopper, and to prevent the escape of fertilizer through said slot a covering-plate or washer 9 is fitted under the head of the bolt 3. By this means the fertilizer attachment as a whole is detachably secured to the frame and can be adjusted longitudinally thereof to take up slack in the chain. The pawl or latch $f^3$, carried by one of the loose sprocket-wheels $f'$, is made to serve as a means for detachably connecting one or both of the sprocket-wheels to the driving-shaft, so that the seeder alone or that the seeder and fertilizer may be driven, or both thrown out of action when desired. To accomplish this, the pawl $f^3$ is furnished with or carries a bolt or pin 10, pivotally connected thereto at a point nearer one end than the other, whereby the pin can, in effect, be lengthened or shortened by reversing it upon its pivotal point of support. Other arrangements might be adapted for effecting the adjustment of this pin, as will be evident upon considering its action.

Both sprocket-wheels, as well as the disk $f^2$, are provided with one or more holes or notches 11 for the reception of the pin 10. When it is desired to disconnect both the seeder and fertilizer, the pawl $f^3$ is elevated and sustained in that position, or the pin 10 turned so as to rest horizontally upon the sprocket-wheel $f'$. To engage the seeding mechanism and leave the fertilizer at rest, the pin 10 is shortened, (as by turning it around until the shorter end is below,) and dropped through the sprocket-wheel $f'$ into one of the notches in the disk $f^2$, the lower end of said pin being held above and removed from the sprocket-wheel 7, as by the end or a portion of the pawl coming in contact with the wheel $f'$. To engage both the seeding and fertilizing mechanisms, the pin 10 is lengthened, as by turning it around until its longer end is below, when it is passed through the notches $f'$ and disk $f^2$ into one of the notches in the lower wheel 7, thereby locking these parts together. They will turn with the shaft F. In this way a simple, cheap, and convenient means is provided for readily throwing one or both of the mechanisms into or out of gear with the driving-shaft.

Although in some respects more convenient, it is not essential that the disk $f^2$ should be interposed between the sprocket-wheels and the pawl secured to the outer wheel, as it is obvious the disk $f^2$ may be above the wheel $f'$ and carry the pawl; but by locating the disk as shown and providing it with a hub 12 the wheel $f'$ is given its bearing on said hub instead of upon the shaft, the weight and friction of said wheel being in such case borne by the disk and shaft, a washer or cap 13 serving to hold the wheel in place on the disk, while the lower wheel rests upon the supporting-bracket $f$.

So far as it relates to the invention hereinbefore described, the fertilizer attachment may be of any approved pattern adapted to be driven by or from the sprocket-wheel 5; but for various reasons I prefer the form shown, the same consisting of a hopper 15, mounted upon and secured to a plate 16, provided with the ears and slots for the bolts 2 3. This plate 16, preferably cast, is formed or provided with an opening or countersink to receive the rotary plate 17, a cross-bar 18 furnishing a bearing for the stud 19 on said plate 17, and the sprocket-wheel 5 is secured to this stud below the bearing.

Near one corner of the plate 16 is formed a bearing 21 for a shaft or stud 22, provided on its upper end with bevel-gear 23, while to its lower end is detachably secured a sprocket-wheel 24. Above the feed-plate 17 is arranged the stirrer 25, supported at one end in a bearing 26, formed upon or secured to the plate 16, the opposite end of the stirrer-shaft being projected through and taking its bearing in one side of a casing 27, the latter detachably secured to the plate 16 by a bolt 28 and adapted to co-operate with the vertical walls of the box or hopper to form an inclosing-casing for the gears 23 and 29, the latter secured to the stirrer-shaft beyond the gear 23. A plate or adjustable bearing-block 30 is interposed between the end of the stirrer-shaft and the inner face of the wall of the hopper and serves to maintain the gears in contact and the stirrer in position.

The casing 27 is designed to protect the gears within the box or hopper, and the plate 16 is perforated beneath the casing to permit the escape of any fertilizer that might sift in through the joints.

The front wall of the box is provided with a scraper 31 and an adjustable valve 32, controlling the feed-orifice 33, through which the fertilizer is delivered into a dependent spout 34, formed on or attached to the plate 16. This spout is preferably made elliptical in cross-section and tapering, its lower end being secured in a tube or conduit 35, which latter is pivotally supported and attached between the flanges or sides of the heel of the runner, whereby the fertilizer is directed with the seed into the furrow and accommodates itself to the movement of the fertilizer attachment when adjusted to tighten the drive-chain. The chain or equivalent flexible driving-belt 6, by which motion is communicated to the feeding-plate or other mechanism through the wheel 5, also operates to drive the stirrer by being passed around or engaging the sprocket-wheel 24, so that by adjusting the fertilizer attachment as a whole the chain may be tightened without changing the relations of the sprocket-wheels. Moreover, any or all of the sprocket-wheels may be removed and others substituted of different diameters to change the relative speeds of the several devices. Thus the speed of the stirrer can be changed without affecting the motion of the feed-plate by substituting a wheel of larger or smaller diameter for the wheel 24, and a like change in the motion of the feed-plate relative to the stirrer can be made, while the speeds of both the stirrer and feed-plate can be augmented or diminished and the relations maintained by a change in the size of the driving-wheel 7.

Having thus described my invention, what I claim as new is—

1. In a planter such as described, wherein the seeding mechanism is operated from a pulley or wheel on a driving-shaft, and in combination with said shaft and a disk or plate secured thereto, two wheels loosely mounted on the shaft and connected the one to the seed and the other to the fertilizer mechanism, and an adjustable locking-pin co-operating with said wheels and disk to lock one or both wheels to the disk, substantially as set forth.

2. In a planter such as described, and in combination with the seed-feeding devices, a fertilizer attachment, and a driving-shaft common to both of said devices, independent driving-wheels loosely supported upon said shaft, a disk or arm secured to said shaft, and a pawl pivoted to one of said members and provided with an adjustable pin for co-operating with notches or perforations in said driving-wheels to connect one or both with the driving-shaft, as and for the purpose set forth.

3. In a planter such as described, the combination of the seeding mechanism and fertilizer attachment mounted upon the frame, a driving-shaft provided with a plate having a hub thereon, a loose sprocket-wheel interposed between said plate and the bearing for the shaft, a second sprocket-wheel taking its bearing on the hub of the plate and held in position by a cap, and a locking-pin adapted to lock said sprocket-wheels to the plate, substantially as described.

4. In a planter such as described, and in combination with the sprocket-wheels for actuating the seeding and fertilizer mechanism through independent sprocket chains or belts and the disk or arm attached to the driving-shaft, an arm carrying a locking-pin pivotally supported at one side of its longitudinal center, substantially as and for the purpose set forth.

5. In a planter such as described, the combination of the frame and the driving-shaft supported in bearings thereon and provided with a sprocket-wheel, a fertilizer attachment adjustably attached to the frame, so as to be movable toward and from the driving-shaft, and provided with an actuating sprocket-wheel connected to the first-named sprocket-wheel by a chain, substantially as set forth.

6. In a planter such as described, the combination, with the driving-shaft and sprocket-wheel, of the fertilizer attachment adjustably secured to the frame, so as to be movable toward and from the driving-shaft, and provided with two sprocket-wheels, the one for actuating the feeding mechanism and the other the stirrer, and a chain engaging all of the sprocket-wheels, substantially as and for the purpose set forth.

7. In a planter such as described, and in combination with the runner and the fertilizer attachment adjustably secured to the frame and provided with a spout, the conduit pivotally attached to the heel of the runner, substantially as described.

8. In a planter such as described, and in combination with the frame and the adjustable fertilizer attachment mounted thereon and provided with a tapered spout, the conduit fitting over said spout and pivotally secured at or near its lower end to the runner, substantially as described.

9. In a planter such as described, and in combination with the frame, a fertilizer attachment provided with a bottom plate having an elongated opening for the passage of a fastening-bolt within the hopper, and a covering-plate for said slot, substantially as described.

10. In a fertilizer attachment for planters such as described, the combination of the hopper and the bottom plate, the stirrer mounted upon said plate and driven by gearing within the hopper, and the casing inclosing said gearing, substantially as and for the purpose set forth.

11. In a fertilizer attachment such as described, and in combination with the bottom plate and the stirrer working within the hopper, the gearing for operating said stirrer, and the detachable casing secured to the bottom plate and co-operating with the wall of the hopper to inclose the gearing, as set forth.

12. In a fertilizer attachment, the combination of the plate provided with a bearing for the feed-plate and for the stirrer, a detachable casing inclosing the driving-gear and forming a bearing for the stirrer, substantially as described.

13. In a fertilizer attachment, the combination of the bottom plate of the hopper provided with bearings for the feed-plate and stirrer-actuating devices, the sprocket-wheels detachably secured to the feed-plate and stirrer-actuating devices and driven by a single sprocket-chain passing around and engaging the sprocket-wheels on the driving-shaft, the feed-plate, and the actuating-shaft of the stirrer, substantially as described.

14. In a fertilizer attachment, and in combination with the bottom plate of the hopper, feeding devices, and the stirrer, with gearing for actuating the latter, a casing secured to the bottom plate and inclosing the gearing, said bottom plate being perforated beneath the casing, substantially as and for the purpose set forth.

15. In a fertilizer attachment, and in combination with the hopper, the stirrer-shaft, and the stud or shaft projected through the bottom plate and provided with a bevel-gear, the bevel-gear applied to the end of the stirrer-shaft, and the adjustable plate or abutment interposed between the end of the stirrer-shaft and the wall of the hopper, substantially as described.

LEVI SCOFIELD.

Witnesses:
MELVILLE CHURCH,
J. B. CHURCH.